(12) United States Patent
Kim

(10) Patent No.: US 9,550,479 B2
(45) Date of Patent: Jan. 24, 2017

(54) APPARATUS AND METHOD OF CONTROLLING BRAKE OF TRACTOR

(71) Applicants: HYUNDAI MOTOR COMPANY, Seoul (KR); KIA MOTORS CORPORATION, Seoul (KR)

(72) Inventor: Dong Hyuk Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/937,417

(22) Filed: Nov. 10, 2015

(65) Prior Publication Data

US 2016/0339883 A1 Nov. 24, 2016

(30) Foreign Application Priority Data

May 18, 2015 (KR) .......................... 10-2015-0068678

(51) Int. Cl.
*B60T 13/58* (2006.01)
*B60T 8/17* (2006.01)
*B60T 8/18* (2006.01)

(52) U.S. Cl.
CPC ............ *B60T 8/1708* (2013.01); *B60T 8/1887* (2013.01); *B60T 2250/02* (2013.01)

(58) Field of Classification Search
USPC ..... 180/244, 245, 247; 192/220; 701/71, 72, 701/73, 78, 93, 96
See application file for complete search history.

(56) References Cited

U.S. PATENT DOCUMENTS

| | | | | |
|---|---|---|---|---|
| 3,823,792 A | * | 7/1974 | Dinkloh | B60K 17/10 180/14.3 |
| 5,438,516 A | * | 8/1995 | Neubauer | B60T 7/20 303/7 |
| 5,496,098 A | * | 3/1996 | Brearley | B60T 1/08 303/22.2 |
| 6,921,139 B2 | * | 7/2005 | Tobler | B60T 13/08 188/112 R |
| 2008/0169144 A1 | * | 7/2008 | DeGrave | B60L 7/08 180/165 |

FOREIGN PATENT DOCUMENTS

| | | |
|---|---|---|
| JP | H08142822 A | 6/1996 |
| JP | H08164832 A | 6/1996 |
| JP | 2008-183970 A | 8/2008 |
| KR | 1996-0003312 B | 3/1996 |
| KR | 10-0867828 B1 | 11/2008 |

* cited by examiner

*Primary Examiner* — Thomas Tarcza
*Assistant Examiner* — Richard Goldman
(74) *Attorney, Agent, or Firm* — McDermott Will & Emery LLP

(57) ABSTRACT

An apparatus for controlling a brake of a tractor towing a trailer includes a trailer sensor for sensing whether or not the trailer is mounted at the tractor, an auxiliary brake driver for driving an auxiliary brake of the tractor, a main brake driver for driving main brakes of the tractor and the trailer, and a controller for setting a ratio of braking force of the auxiliary brake to a reference value with respect to a required braking force from a smart cruise control (SCC) system and allocating the remaining required braking force to the main brakes of the tractor and the trailer in the case in which the trailer sensor senses that the trailer is mounted at the tractor.

6 Claims, 2 Drawing Sheets

APPARATUS AND METHOD OF CONTROLLING BRAKE OF TRACTOR

CROSS-REFERENCE TO RELATED APPLICATION

This application claims the benefit of priority to Korean Patent Application No. 10-2015-0068678, filed on May 18, 2015 with the Korean Intellectual Property Office, the disclosure of which is incorporated herein in its entirety by reference.

TECHNICAL FIELD

The present disclosure relates to an apparatus and a method of controlling a brake of a tractor, and more particularly, to a technology of changing a ratio of braking force of an auxiliary brake depending on whether or not a trailer is mounted to a tractor in which a smart cruise control (SCC) system is mounted.

BACKGROUND

Generally, a commercial vehicle such as a truck, a bus, a tractor, and the like, is mounted with an auxiliary brake in order to prevent overheating of a brake drum and a brake lining generated due to a braking force continuously applied to a main brake.

An example of this auxiliary brake includes an exhaust brake decreasing an output of an engine by an exhaust control of an exhaust gas, an engine brake using a load of the engine by gear shifting, an intarder sharing oil pressure of a transmission and forcibly constraining a propeller shaft through a valve opened or closed by a control signal applied from an electronic control unit (ECU), a retarder operated by a principle of an electromagnet and forcibly constraining a propeller shaft through magnetic force generated by a control signal applied from the ECU, and the like.

An apparatus of controlling a brake of a tractor according to the related art first generates maximum baking force through the auxiliary brake and generates braking force exceeding the maximum braking force through the main brake, with respect to a required braking force.

For example, in the case in which braking force of 3000 NM is required, braking force of 2000 NM (maximum value) is allocated to the auxiliary brake, and the remaining braking force of 1000 NM is allocated to the main brake.

Therefore, at the time of braking in the case in which a trailer is mounted, the braking force of the auxiliary brake is larger than that of the main brake, such that a phenomenon that the tractor and the trailer are bent like a jackknife occurs.

SUMMARY

The present disclosure has been made to solve the above-mentioned problems occurring in the prior art while advantages achieved by the prior art are maintained intact.

An aspect of the present disclosure provides an apparatus and a method of controlling a brake of a tractor capable of preventing a jackknife phenomenon by decreasing braking force of an auxiliary brake and increasing braking force of a main brake depending on whether or not a trailer is mounted at the tractor in which a smart cruise control (SCC) system is mounted.

Objects of the present disclosure are not limited to the above-mentioned object, and other objects and advantages of the present disclosure that are not mentioned may be understood by the following description and will be more clearly appreciated by exemplary embodiments of the present disclosure. In addition, it may be easily appreciated that objects and advantages of the present disclosure may be realized by means mentioned in the claims and a combination thereof.

According to an exemplary embodiment of the present disclosure, an apparatus of controlling a brake of a tractor towing a trailer includes: a trailer sensor configured to sense whether or not the trailer is mounted at the tractor; an auxiliary brake driver configured to drive an auxiliary brake of the tractor; a main brake driver configured to drive main brakes of the tractor and the trailer; and a controller configured to set a ratio of braking force of the auxiliary brake to a reference value with respect to required braking force from an SCC system and allocate the remaining required braking force to the main brakes of the tractor and the trailer in the case in which the trailer sensor senses that the trailer is mounted at the tractor.

According to another exemplary embodiment of the present disclosure, a method of controlling a brake of a tractor towing a trailer includes: a trailer sensor sensing whether or not the trailer is mounted at the tractor; and a controller setting a ratio of braking force of an auxiliary brake of the tractor to a reference value with respect to required braking force from an SCC system and allocating the remaining required braking force to main brakes of the tractor and the trailer in the case in which the trailer is mounted at the tractor.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

The above-mentioned objects, features, and advantages will become more obvious from the following description described below in detail with reference to the accompanying drawings. Therefore, those skilled in the art to which the present disclosure pertains may easily practice a technical idea of the present disclosure. Further, in describing the present disclosure, in the case in which it is judged that a detailed description of a well-known technology associated with the present disclosure may unnecessarily make the gist of the present disclosure unclear, it will be omitted. Hereinafter, exemplary embodiments of the present disclosure will be described in detail with reference to the accompanying drawings.

Figure 1:
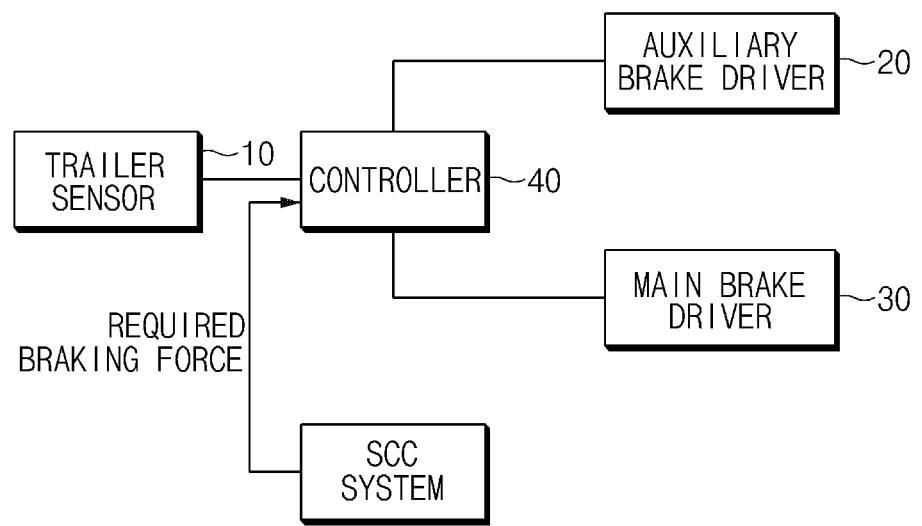
FIG. 1 is a block diagram illustrating an apparatus for controlling a brake of a tractor according to an exemplary embodiment of the present disclosure.

FIG. 1 is a block diagram illustrating an apparatus for controlling a brake of a tractor according to an exemplary embodiment of the present disclosure.

As illustrated in FIG. 1, the apparatus for controlling a brake of a tractor according to an exemplary embodiment of the present disclosure may include a trailer sensor 10, an auxiliary brake driver 20, a main brake driver 30, and a controller 40.

The above-mentioned respective components will be described. First, the trailer sensor 10 senses whether or not a trailer is mounted at a tractor. Here, the trailer is preferably a semi-trailer connected to the tractor through a king pin of the tractor to allow some of a manifest weight to be directly supported by the tractor, but is not limited thereto.

In addition, the trailer sensor 10 may sense whether or not a load is loaded in the trailer as well as whether or not the trailer is mounted at the tractor.

Next, the auxiliary brake driver 20, which is a module driving, for example, a retarder, is operated based on a control signal from the controller 40.

Next, the main brake driver 20, which is a module inducing, or capable of producing, a frictional force between drums and linings each provided in wheels of the tractor and wheels of the trailer to generate a braking force, is operated based on a control signal from the controller 40.

Next, the controller 40 performs a general control so that the above-mentioned respective components may normally perform their functions.

Particularly, the controller 40 adjusts a ratio of braking force of the auxiliary brake with respect to required braking force from a smart cruise control (SCC) system based on a result sensed by the trailer sensor 10. Here, the ratio of the braking force means a ratio of generated braking force to maximum braking force of the auxiliary brake.

That is, the controller 40 sets the ratio of the braking force of the auxiliary brake to a reference value and generates the remaining required braking force through main brakes in the case in which the trailer is mounted at the tractor. In the case in which the trailer is not mounted at the tractor, the auxiliary brake is used as much as possible as in the scheme according the related art, and insufficient braking force is generated through the main brakes.

For example, in the case in which the trailer is not mounted at the tractor, when the required braking force is 3000 NM, 2000 NM (maximum value) is allocated to the auxiliary brake, and the remaining 1000 NM is allocated to the main brakes.

In the case in which the trailer is mounted at the tractor, the ratio of braking force of the auxiliary brake is set to the reference value (for example, 40% of the maximum value), and the remainder is allocated to the main brakes. That is, 800 MN is allocated to the auxiliary brake, and 2200 NM is allocated to the main brakes.

Although the retarder has been described as an example of the auxiliary brake in the present disclosure in order to assist in the understanding, the number of auxiliary brakes does not have an influence on the present disclosure.

Figure 2:
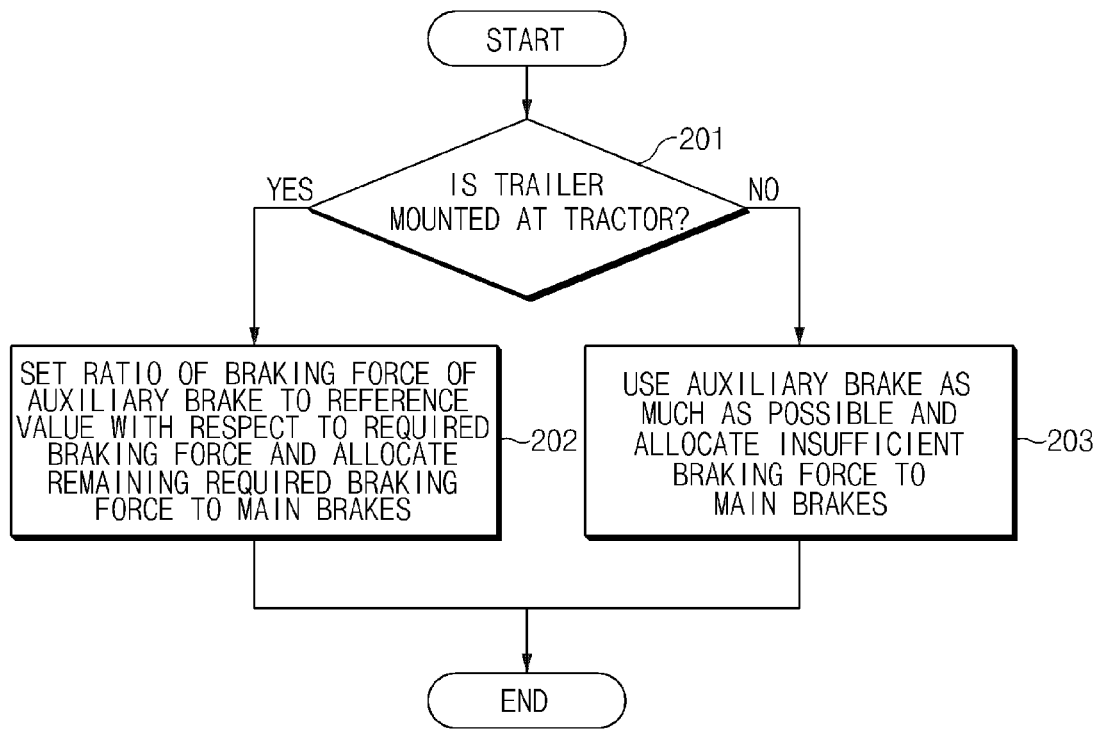
FIG. 2 is a flow chart illustrating a method of controlling a brake of a tractor according to an exemplary embodiment of the present disclosure.

FIG. 2 is a flow chart illustrating a method of controlling a brake of a tractor according to an exemplary embodiment of the present disclosure.

First, the trailer sensor 10 senses whether or not the trailer is mounted at the tractor (201).

When the trailer is mounted at the tractor as a sensing result (201), the controller 40 sets the ratio of the braking force of the auxiliary brake of the tractor to the reference value with respect to the required braking force from the SCC system and allocates the remaining required braking force to the main brakes of the tractor and the trailer (202).

In this case, the auxiliary brake driver 20 drives the auxiliary brake included in the tractor so that braking force corresponding to the reference value is generated, and the main brake driver 30 drives the main brakes included in the tractor and the trailer under a control of the controller 40.

When the trailer is not mounted at the tractor as a sensing result (201), the controller 40 uses only the braking force of the auxiliary brake of the tractor with respect to the required braking force from the SCC system, and allocates insufficient braking force to the main brake in the case in which the braking force of the auxiliary brake is insufficient (203).

Meanwhile, the method of controlling a brake of a tractor according to an exemplary embodiment of the present disclosure as described above may be implemented by a computer program. In addition, codes and code segments configuring the computer program may be easily inferred by a computer programmer skilled in the art. Further, the computer program is stored in a computer-readable recording medium (information storing medium) and is read and executed by a computer to implement the method of controlling a brake of a tractor according to an exemplary embodiment of the present disclosure. In addition, the computer-readable recording medium includes all types of recording media that may be read by the computer.

As described above, according to an exemplary embodiment of the present disclosure, the braking force of the auxiliary brake is decreased and the braking force of the main brake is increased depending on whether or not the trailer is mounted at the tractor in which the SCC system is mounted, thereby making it possible to prevent a jackknife phenomenon.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling a brake of a tractor towing a trailer, comprising:
    a trailer sensor for sensing whether or not the trailer is mounted at the tractor;
    an auxiliary brake driver for driving an auxiliary brake of the tractor;
    a main brake driver for driving main brakes of the tractor and the trailer; and
    a controller for setting a ratio of braking force of the auxiliary brake to a reference value with respect to a required braking force from a smart cruise control (SCC) system and allocating the remaining required braking force to the main brakes of the tractor and the trailer in the case in which the trailer sensor senses that the trailer is mounted at the tractor.

2. The apparatus for controlling a brake of a tractor according to claim 1, wherein the trailer sensor senses whether or not a load is loaded in the trailer as well as whether or not the trailer is mounted at the tractor.

3. The apparatus for controlling a brake of a tractor according to claim 1, wherein the auxiliary brake is a retarder.

4. A method of controlling a brake of a tractor towing a trailer, comprising:
    a trailer sensor sensing whether or not the trailer is mounted at the tractor; and
    a controller setting a ratio of braking force of an auxiliary brake of the tractor to a reference value with respect to a required braking force from an SCC system and allocating the remaining required braking force to main brakes of the tractor and the trailer in the case in which the trailer is mounted at the tractor.

5. The method of controlling a brake of a tractor according to claim 4, wherein in the step of sensing whether or not the trailer is mounted at the tractor, it is sensed whether or not a load is loaded in the trailer as well as whether or not the trailer is mounted at the tractor.

6. The method of controlling a brake of a tractor according to claim 4, wherein the auxiliary brake is a retarder.

* * * * *